April 15, 1969 H. GEHRMANN 3,439,119
CIRCUIT ARRANGEMENT FOR TELEGRAPH STORAGE EXCHANGE INSTALLATIONS
Filed Feb. 25, 1965
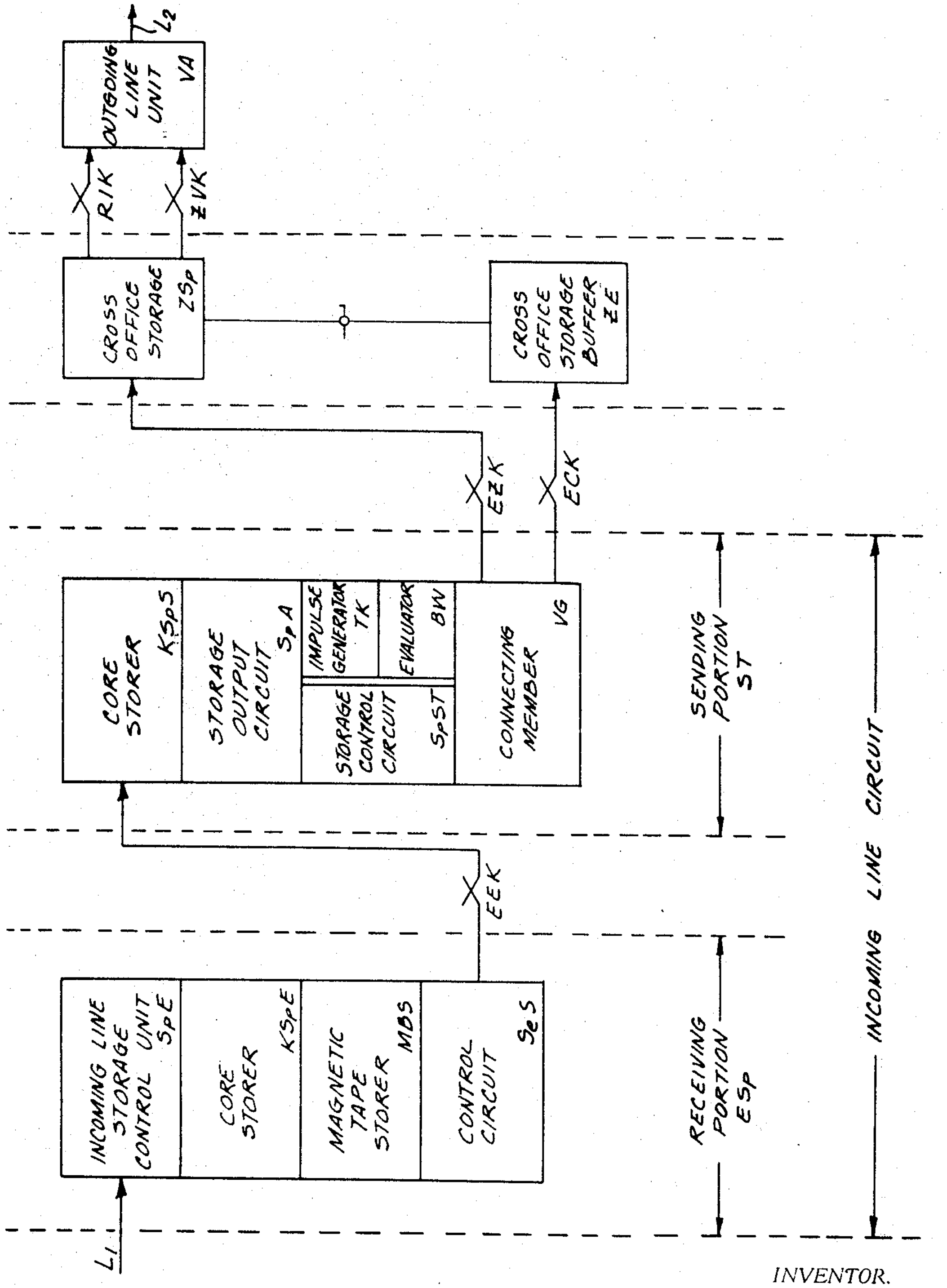
INVENTOR.
HORST GEHRMANN
BY Hill, Sherman, Meroni, Gross & Simpson ATTORNEYS United States Patent Office 3,439,119
Patented Apr. 15, 1969

3,439,119

CIRCUIT ARRANGEMENT FOR TELEGRAPH STORAGE EXCHANGE INSTALLATIONS

Horst Gehrmann, Munich, Germany, assignor to Siemens Aktiengesellschaft, Munich, Germany, a corporation of Germany Filed Feb. 25, 1965, Ser. No. 435,179
Claims priority, application Germany, Feb. 26, 1964, S 89,692
Int. Cl. H041 *11/04, 17/16*
U.S. Cl. 178—17.5 4 Claims

ABSTRACT OF THE DISCLOSURE

A circuit arrangement for a telegraph storage exchange installation wherein incoming messages are stored in an input storage unit at a predetermined speed and further including means within the input storage unit to convert the received messages to an increased speed corresponding to the speed of the intraexchange. The input storage unit consists of a receiving portion and a transmitting portion separate from one another but being connectable to one another such that the transmitting portion is operated as a centralized speed converter.

The invention relates to a circuit arrangement for telegraph storage exchange installations wherein the storage of the incoming messages is accomplished in input storage units and means are provided for conversion of the incoming messages to an intraexchange speed which is greater than the speed of the incoming lines.

It is a known practice in telegraph engineering, in the planning of telegraph storage exchange installations, to provide in the individual communication exchanges input storage units on the receiving side, which may be permanently allocated to the incoming lines or else connected, as required, over selector switching means. These input storage units consist, in known manner, of a receiving portion and a sending portion. The receiving portion accepts the messages transmitted over the incoming lines and records them in any form, as, for example, by punching or magnetizing a recording carrier, while the sending portion scans the messages recorded by the receiving portion either immediately or at a later time and transmits them over the intraexchange systems of the exchange installation itself to the outgoing line or lines.

In order to keep the busy or occupied time of the intraexchange systems—as, for example, selector systems, transmission systems, intermediate storers etc.—as short as possible, it is also a known practice in telegraph storage exchange technology to make the so-called intraexchange speed, that is, the telegraphing speed from the sending portion of the receiving storer to the receiving portion of the output storer, considerably higher than the telegraphing speed of the incoming messages. In this manner it is possible to keep the busy or occupied time of the intraexchange systems relatively short. However, it has been determined that the load ratio of message handling ability of the input storer is insufficient in that receiving portion of the input storer unit is operated at a low telegraphing speed during the entire receiving time of the incoming message, and the sending portion of this input storage unit, when its sending speed is set high in correspondence to the increased intraexchange speed, is operative only during the portion of the receiving time corresponding to the relation of the incoming telegraphing speed to the intraexchange speed. In other words, the sending portion is operated only a part of the time during which the receiving portion is recording the incoming message. During the remaining time the sending portion is entirely inoperative.

The invention therefore has as its problem that of eliminating this unfavorable load ratio of the receiving portion to the sending portion of an input storer when using an increased intraexchange speed. For the solution of this problem the invention proceeds from the concept of subdividing the input storage units into a receiving portion and a sending portion, and allocating only the receiving portion to the lines. According to the invention this problem is solved by the method that the input storage units, consisting of a receiving portion and a sending portion, are separable from one another and the sending portion which is a centralized speed converter, is available for several receiving portions allocated to the incoming lines.

In this manner it is possible, according to the invention, to considerably improve the load ratio of the receiving portion to the sending portion of an input storage unit. The sending portion to be converted to the increased intraexchange speed is connected to the receiving portion only for the time which is actually needed to transmit the received message from the input side to the output side of the communication system at the increased intraexchange speed.

The invention can be used to great advantage in storage exchanges with magnetic type of recording, regardless of whether it be magnetic tapes or magnetic cores, in a manner such that the input storage unit consisting of a magnetic tape storer, two core storers of considerably smaller capacity, an input control circuit and a sending control circuit with an impulse generator is so subdivided that one of the two core storers and the sending control circuit are grouped with the impulse generator to the speed converter.

In this manner it is possible by simple means, through the sending control circuit, to scan the magnetic tape belonging to the receiving portion in a groupwise or blockwise manner and to cause the information items contained therein to be sent out.

Details of the invention will be apparent from the circuit described with the aid of the drawing.

In the drawing there is represented, on the left-hand side, an incoming line L1, and, on the right-hand side, an outgoing line L2. The incoming line L1 is connected with an incoming line circuit which, according to the invention, is subdivided into a receiving portion ESp and a sending portion ST. The two are selectively coupled over the coupling network EEK. The receiving portion contains a storage input circuit S*p*E, a core storer KS*p*E, which, for example, has relatively low storage capacity of 210 Bit, a magnetic tape storer MBS whose capacity is dimensioned according to the performance demanded of it and which, in the scope of the invention, can be constructed as an endless tape storer of finite capacity, or a drum or plate storer, as well as a tape storer with unlimited capacity. Further, the receiving portion ES*p* comprises a storage circuit arrangement SeS which effects a connection to the transmitting portion ST when the magnetic tape storage unit is almost completely filled with a message.

The sending portion of the input storage unit ST consists of a core storer KS*p*S which, like the core storer in the receiving portion, may have a capacity of, for example 210 Bit. The sending portion also includes a storage output circuit S*p*A, an impulse generator TK, the evaluator BW, a storge control circuit S*p*ST and a connecting member VG. The sending portion of this input storage unit is connected to the further intraexchange systems of the communication installation over the two couplers EZK and ECK. The intraexchange systems of the exchange installation in this example, in the interest of simplicity, are represented only by a temporary storer ZS*p*, a cross office storage buffer ZE and the exchange connection couplers RIK and ZVK.

The operation of the circuit system represented in the drawing is, in detail, as follows: First of all, the incoming message passes into the storage input circuit S*p*E. This storage input circuit is operated at the telegraphing speed of the incoming line L1 and contains the usual switching means necessary for the connection of exchange circuits. From there, the messages pass, in the sequence of the received steps into the core storer KS*p*E. The core storer passes the message, if desired also blockwise, to the magnetic tape storer MBS. Thereby there is possible an easier control and recording within the magnetic tape storer.

At a given time, when the magnetic tape storer has largely been filled with the incoming message, either over the storage input circuit S*p*E or the sending control circuit S*e*S, the coupler EEK can be caused to connect a sending portion ST, which has just become free, to the receiving portion. When a connection has been established, the message being stored in the magnetic tape storage MBS will be read out blockwise by pulses of the impulse generator TK. This is accomplished through both the storage circuit arrangement S*e*S in the receiving portion ES*p* and S*p*S*t* of the transmitting portion ST which is connected across the coupler EEK. Because these pulses correspond to the high cross-office transmission speed the messages within the incoming line circuit are also transmitted with this speed. The transmitting portion ST transmits the messages over the storage output circuit SPA, the storage circuit arrangement S*p*S*t* to the further intraexchange systems. This is accomplished after the storage circuit arrangement S*p*S*t*, in interaction with the character interpreter BW, has correspondingly evaluated the selection information for the adjustment of the coupler EZK.

Through the separation of the circuit means determining the intraexchange speed, especially of the impulse generator TK and of the core storer KS*p*S, from the receiving portion proper, it is possible, within the scope of the invention, to make the individual receiving units, which have to be provided in one of the number of incoming lines present, smaller and thus make them cheaper from an economic viewpoint. Further, for the utilization of the invention, the sending parts which are connected over the selecting switching means possibly to the receiving parts, need to be present only to an extent corresponding to the ratio of the intraexchange speed to the incoming telegraphing speed. If, for example the telegraphing speed on the incoming lines amounts to 50 Bd, and the intraexchange speed amounts to 24 times that amount (1200 Bd), then theoretically only one sending portion is needed for twenty-four receiving portions within the input storage units, since the sending portion need be connected alternatingly to each input storage unit, only during the particular sending time from such unit.

The present invention is not limited to the particular example represented in the drawing, with the input storage units permanently allocated to the incoming lines, but can also be realized within the same scope in the case of a storage exchange installation with input storage units freely allocatable to the incoming lines.

I claim:

1. A circuit arrangement for a telegraph storage exchange installation comprising: an input storage unit for receiving messages at a given speed and for retransmitting the messages at a greater speed, said input storage unit comprising: a plurality of receiving portions for receiving incoming messages; a transmitting portion connectable to respective ones of said receiving portions, said sending portion being operated as a centralized speed converter, whereby, said sending portion is connectable to several receiving portions allocated to the input lines.

2. A circuit arrangement for a telegraph storage exchange installation according to claim 1 wherein said sending portion is connectable to each of the plurality of said receiving portions through a selector switch means EEK.

3. A circuit arrangement for a telegraph storage exchange installation according to claim 1 wherein said receiving portion comprises: a storage input circuit connected to the input line of the storage exchange, magnetic tape storage means, magnetic core storage means connected between said storage input circuit and said magnetic tape storage, and control circuit means connected to said magnetic tape storage for controlling the connection of said magnetic tape storage to said sending portion.

4. A circuit arrangement for a telegraph storage exchange installation according to claim 1 wherein said sending portion comprises: magnetic core storage means connected to said receiving portion, storage output means connected to said magnetic core storer, a storage control circuit connected to said storage output circuit, impulse generator means also connected to said storage output circuit, an evaluator circuit connected to said impulse generator, and connecting means connected to said storage control circuit and to said evaluator means for connecting the output of said sending portion to an intraexchange portion of the telegraph storage exchange installation.

References Cited

UNITED STATES PATENTS 3,006,986 10/1961 Vernam et al. ---------- 178—2

THOMAS A. ROBINSON, *Primary Examiner.*

U.S. Cl. X.R.

178—3, 26